(12) United States Patent
Idemitsu et al.

(10) Patent No.: US 10,012,817 B2
(45) Date of Patent: Jul. 3, 2018

(54) LENS BARREL AND IMAGING DEVICE EQUIPPED WITH THE LENS BARREL

(71) Applicant: Panasonic Intellectual Property Management Co., Ltd., Osaka (JP)

(72) Inventors: Koji Idemitsu, Hyogo (JP); Hironori Honsho, Hyogo (JP); Masahiro Inata, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 122 days.

(21) Appl. No.: 15/077,271

(22) Filed: Mar. 22, 2016

(65) Prior Publication Data

US 2016/0282579 A1    Sep. 29, 2016

(30) Foreign Application Priority Data

Mar. 24, 2015  (JP) .................................. 2015-060366
Jan. 8, 2016   (JP) .................................. 2016-002213

(51) Int. Cl.
G02B 7/04   (2006.01)
G02B 7/10   (2006.01)
G03B 3/10   (2006.01)

(52) U.S. Cl.
CPC ................. G02B 7/10 (2013.01); G03B 3/10 (2013.01)

(58) Field of Classification Search
CPC ..................................... G02B 7/10; G03B 3/10
See application file for complete search history.

(56) References Cited

U.S. PATENT DOCUMENTS

| 5,652,928 A * | 7/1997 | Baxter | G03B 17/04 396/136 |
| 2003/0231879 A1* | 12/2003 | Kohno | G03B 17/425 396/79 |
| 2005/0207744 A1 | 9/2005 | Yano | |
| 2013/0201389 A1 | 8/2013 | Ohtani | |
| 2014/0327813 A1 | 11/2014 | Wu et al. | |

FOREIGN PATENT DOCUMENTS

| JP | 2005-084592 A | 3/2005 |
| JP | 2005-274631 A | 10/2005 |
| JP | 2010-112977 A | 5/2010 |
| JP | 2013-178501 A | 9/2013 |
| WO | 2013/111662 A1 | 8/2013 |

* cited by examiner

*Primary Examiner* — Joseph P Martinez
(74) *Attorney, Agent, or Firm* — McDermott Will & Emery LLP

(57) ABSTRACT

A lens barrel in the present disclosure includes: a lens frame; a movable lens held in the lens frame; a guide member that moves the lens frame in a first direction; a driver including a drive coil and a magnet that move the lens frame with electric power being supplied to the driver; a drive circuit that drives the driver; and a switching circuit that short-circuits ends of the drive coil when the drive circuit is in a non-energized state.

10 Claims, 9 Drawing Sheets

LENS BARREL AND IMAGING DEVICE EQUIPPED WITH THE LENS BARREL

RELATED APPLICATIONS

This application claims the benefit of priority of Japanese Application No. 2015-060366, filed on Mar. 24, 2015, and Japanese Application No, 2016-002213, filed Jan. 8, 2016, the disclosures of which are incorporated by reference herein.

BACKGROUND

1. Technical Field

The present disclosure relates to a lens barrel that includes a driving device having a linear actuator and to an imaging device equipped with this type of lens barrel.

2. Description of Related Art

Unexamined Japanese Patent Publication No. 2010-112977 (referred to below as "Patent Literature 1") discloses an exemplary lens barrel that includes a driving device having a holder for integrally-formed movable parts.

The lens barrel disclosed in Patent Literature 1 includes: a driven member; cylindrical bodies each made of a non-magnetic material; a movable magnet; a plurality of electromagnet coils; a center yoke; and a driving member. The movable magnet is attached to the driven, member and is movable along the outside of the cylindrical body. The electromagnet coils are disposed inside the cylindrical body and arranged in an axial direction of the cylindrical body. These electromagnet coils each exert an electromagnetic force on the movable magnet. The center yoke is made of a magnetic material and disposed within the central area in the cylindrical body. The driving member drives the driven member by deforming the cylindrical body. With the lens barrel configured above, a connection wire of the driving device is not displaced and thus does not interfere with the movements of the driven member, the movable magnet, and such other movable parts.

SUMMARY

A lens barrel in the present disclosure includes: a lens frame; a movable lens held in the lens frame; a guide member that moves the lens frame in a first direction; a driver including a drive coil and a magnet that move the lens frame with electric power being supplied to the driver; a drive circuit that drives the driver; and a switching circuit that short-circuits ends of the drive coil when the drive circuit is in a non-energized state.

DETAILED DESCRIPTION

Exemplary Embodiments

Some exemplary embodiments will be described in detailed below with reference to the accompanying drawings. It should be noted that in some cases, detailed descriptions may not be given, for the purpose of preventing description from being excessively redundant and helping an understanding of those skilled in the art. For example, technical matters known in the art will not be described in detail, or configurations that are substantially the same as those stated previously will not be described.

Descriptions that will be given below and the accompanying drawings should be used to help a sufficient understanding of the present disclosure and are not intended to limit the subject matters in the claims.

First Exemplary Embodiment

A first exemplary embodiment will be described below with reference to FIG. 1 to FIG. 4.

[1-1. Configuration]

[1-1-1. Imaging Device]

First, a description will be given of a configuration of an imaging device including lens barrel 120.

Figure 1:
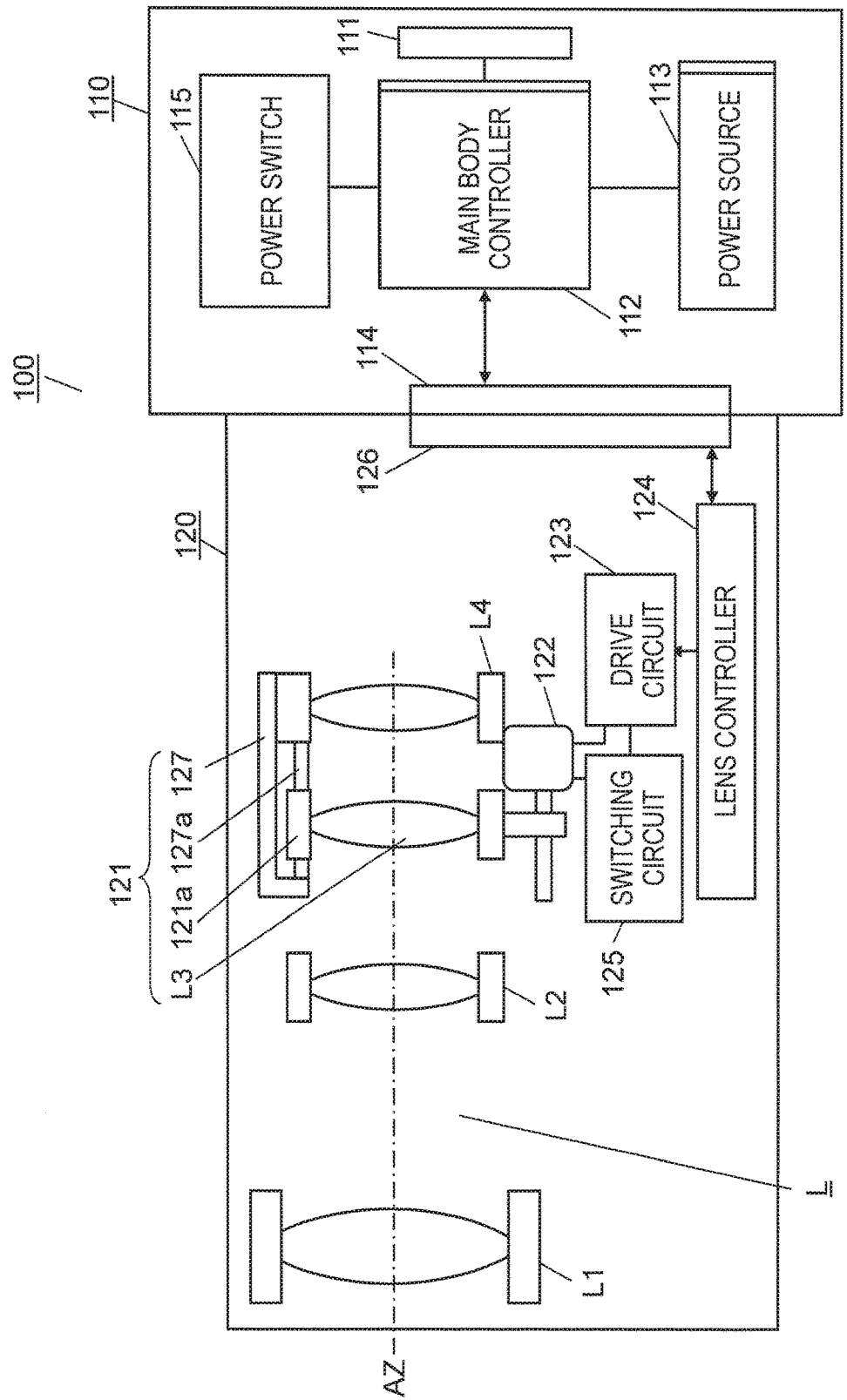
FIG. 1 schematically illustrates a configuration of a digital camera in a first exemplary embodiment.

FIG. 1 schematically illustrates a configuration of an imaging device including lens barrel 120 in the first exemplary embodiment. Hereinafter, digital camera 100 equipped with an interchangeable lens will be described as an exemplary imaging device.

As illustrated in FIG. 1, digital camera 100 in the first exemplary embodiment includes camera main body 110 forming a main body of digital camera 100 and lens barrel 120 detachably attached to camera main body 110, as main components.

<Camera Main Body>

Camera main body 110 includes imaging element 111, main body controller 112, power source 113, body mount 114, and power switch 115. Imaging element 111 receives a subject image created by optical system L. Main body controller 112 is connected to lens controller 124 through body mount 114 and lens mount 126. Body mount 114 has an electric contact and is connected to lens mount 126 in lens barrel 120. Power switch 115 is an operation part that switches between ON and OFF states of camera main body 110.

<Lens Barrel>

Lens barrel 120 includes optical system L, focus lens unit 121, which is an exemplary movable part, focus actuator 122, which is an exemplary driver, drive circuit 123, lens controller 124, switching circuit 125, and lens mount 126.

Optical system L includes first lens L1, second lens L2, focus lens L3, which is an exemplary movable lens, and fourth lens L4. Focus lens unit 121 includes focus lens L3 and guide member 127. Focus actuator 122 includes a drive coil, a magnet, and a yoke. Focus actuator 122 is an exemplary driver that moves the focus lens L3, which serves as a movable lens. Drive circuit 123 is an exemplary circuit that drives the focus actuator 122. Lens controller 124 controls an operation of drive circuit 123, thereby driving focus actuator 122. Switching circuit 125 switches the connection between drive circuit 123 and focus actuator 122 from one state to another, depending on whether electric power is supplied to lens barrel 120. More specifically, switching circuit 125 connects drive circuit 123 to focus actuator 122 or disconnects drive circuit 123 from focus actuator 122.

As long as lens barrel 120 is connected to camera main body 110 and power switch 115 is in an ON state, lens controller 124 is supplied with electric power from power source 113. Both drive circuit 123 and switching circuit 125 are also supplied with the electric power from power source 113 in camera main body 110 through lens mount 126.

Lens barrel 120 configured above operates in the following manner.

When the electric power is supplied from power source 113 in camera main body 110 to lens barrel 120, lens controller 124 monitors a position of lens frame 121a supporting focus lens L3. Then, on the basis of the detected position information, lens controller 124 transmits a control signal indicating a displacement of focus lens L3 to drive circuit 123. Drive circuit 123 drives focus actuator 122 on the basis of control signals transmitted from lens controller 124 and main body controller 112 in camera main body 110. Thus, focus actuator 122 moves focus lens L3, thereby performing a focus operation.

When no electric power is supplied to lens barrel 120, switching circuit 125 switches to short-circuit the connection between drive circuit 123 and focus actuator 122. Details of the switching operation will be described later.

Lens barrel 120 operates in the above manner.

Next, a description will be given of configurations of focus lens unit 121 and focus actuator 122, with reference to FIG. 2 and FIG. 3.

Figure 2:
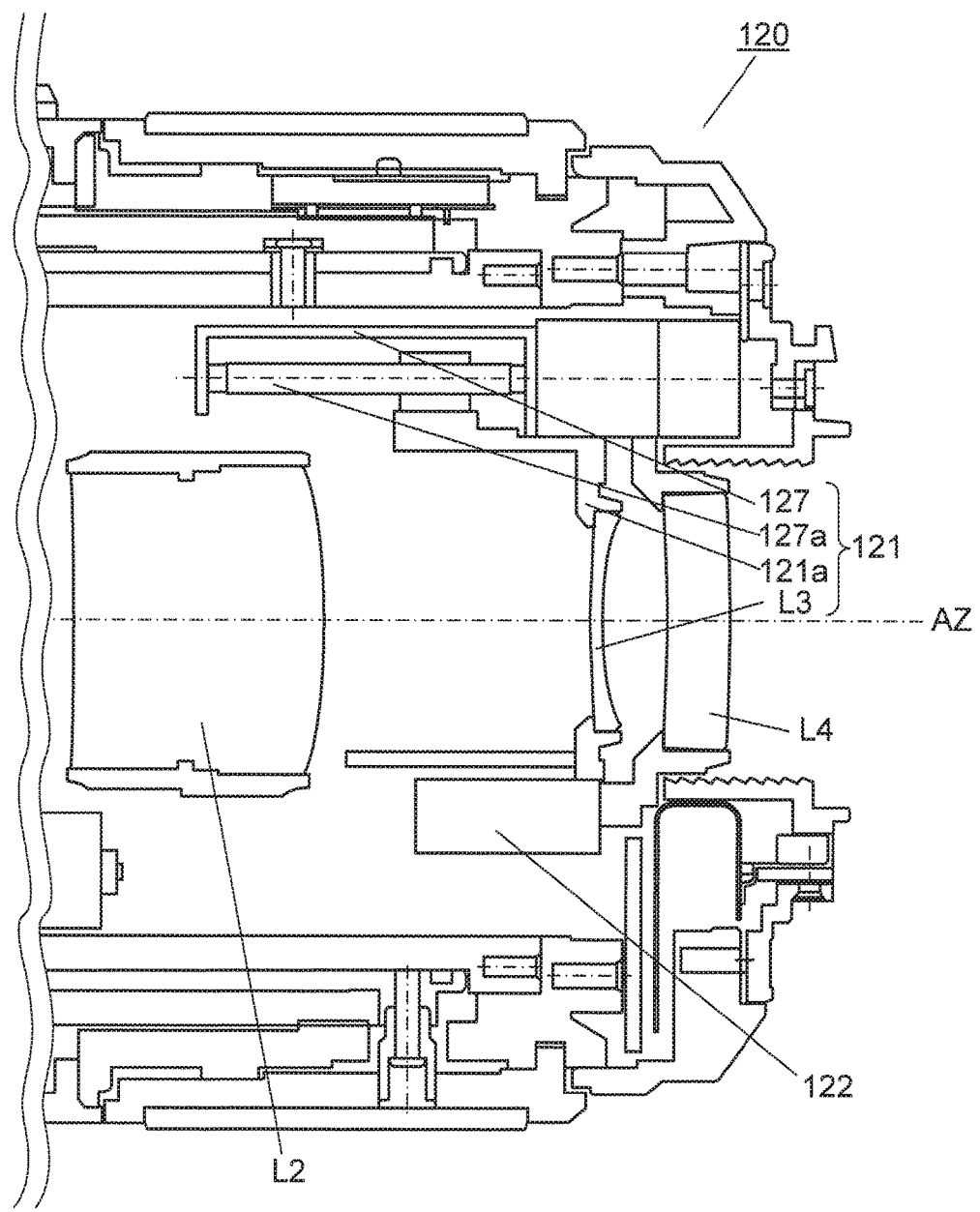
FIG. 2 schematically illustrates an exemplary configuration of the lens barrel in the first exemplary embodiment.

FIG. 2 schematically illustrates exemplary configurations of focus lens unit 121, focus actuator 122, and other peripheral components in lens barrel 120 in the present disclosure. FIG. 3 schematically illustrates illustrative, exemplary configurations of focus lens unit 121 and focus actuator 122, both of which constitute a driver.

Figure 3:
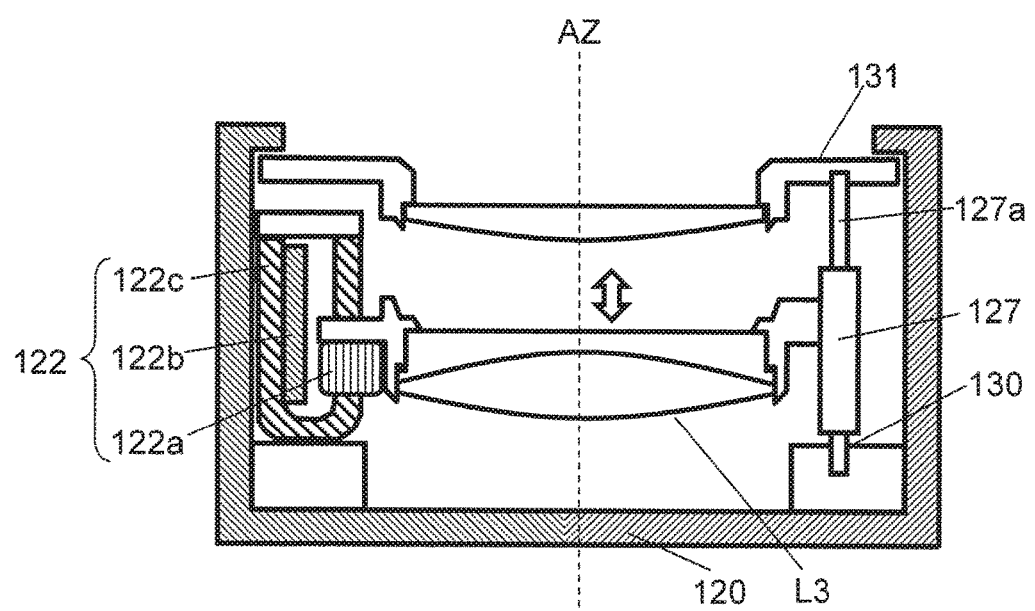
FIG. 3 schematically illustrates an exemplary configuration of the driver in the lens barrel in the first exemplary embodiment.

As illustrated in FIG. 2 and FIG. 3, focus lens unit 121 moves along guide shaft 127a of guide member 127 in the direction along optical axis AZ of lens barrel 120, for example, while sliding on guide shaft 127a, Drive coil 122a in focus actuator 122 is fixed to lens frame 121a of focus lens L3, which serves as a movable lens. Focus actuator 122 includes drive coil 122a and a magnetic circuit formed by magnet 122b and yoke 122c. Magnet 122b and yoke 122c in focus actuator 122 are fixed to lens barrel 120 and separate from drive coil 122a with a space therebetween. In this case, magnet 122b is disposed so as to generate magnetic flux in a direction orthogonal to a direction in which current flows through drive coil 122a in focus actuator 122. A Lorentz force thereby acts on drive coil 122a so that drive coil 122a moves along guide shaft 127a. As a result, focus lens L3 fixed to drive coil 122a moves along optical axis AZ.

When no electric power is supplied to lens barrel 120, focus actuator 122 is not powered. If both ends of drive coil 122a are not interconnected, the Lorentz force does not act on drive coil 122a. Therefore, when lens barrel 120 is shaken or inclined, focus lens L3 freely moves along guide shaft 127a, for example, while sliding on guide shaft 127a. In this case, focus lens L3 may collide with mechanical end 130 of guide member 127 or other parts of lens frame 131 illustrated in FIG. 3, thereby making a collision sound. This collision sound might make a user feel something strange. Furthermore, if lens frame 121a is enlarged in size and heavier, the collision sound is prone to being louder.

In the present disclosure, when the electric power supply to drive circuit 123 in lens barrel 120 is interrupted, lens controller 124 controls switching circuit 125 to short-circuit both ends of drive coil 122a in focus actuator 122. In this state, if focus lens L3 starts to move, current flows through drive coil 122a so as to inhibit the movement of focus lens L3. In other words, current flows through drive coil 122a so as to generate a counter electromotive force, which prevents the movement of focus lens L3. As a result, focus lens L3 is prevented from moving within lens barrel 120. Therefore, it is possible to suppress a collision sound from being made when no electric power is supplied to lens barrel 120.

[1-1-2. Switching Circuit]

A detailed description will be given of foregoing switching circuit 125 in lens barrel 120, with reference to FIG. 4. In the first exemplary embodiment, an illustrative configuration of optical MOSFET 133, which exemplifies switching circuit 125, will be described.

Figure 4:
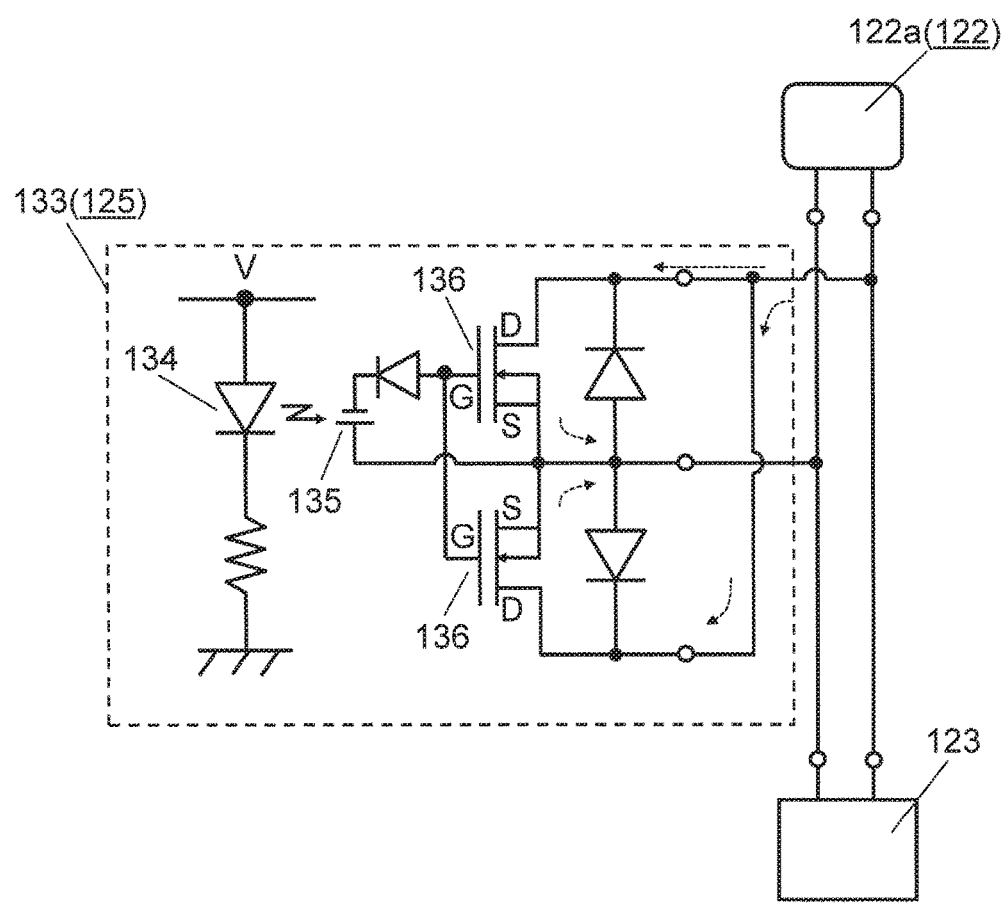
FIG. 4 is a schematic circuit diagram of the switching circuit in the first exemplary embodiment.

FIG. 4 is a schematic circuit diagram of switching circuit 125 in the first exemplary embodiment.

As illustrated in FIG. 4, optical MOSFET (Metal Oxide Semiconductor Field Effect Transistor) 133, which serves as switching circuit 125 in the first exemplary embodiment, includes LED 134, power generating element 135, and two depletion-type MOSFETs 136 which serve as a switching element.

Optical MOSFET 133 is connected to drive coil 122a in focus actuator 122 in parallel to drive circuit 123.

When being supplied with the electric power from camera main body 110, drive circuit 123 controls a voltage to be applied across drive coil 122a in focus actuator 122 on the basis of the control signal from lens controller 124. In this state, LED 134 in optical MOSFET 133 emits light using the electric power supplied from camera main body 110. Then, photodiode that forms power generating element 135 receives the light and generates a voltage. The voltage at gates G of the two MOSFETs 136 is thereby shifted toward the negative side, and the continuity between drain D and source S of each MOSFET 136 is interrupted (i.e., each MOSFET 136 is turned OFF). This opens the circuit between optical MOSFET 133 and drive coil 122a in focus actuator 122. Consequently, no current flows through optical MOSFET 133, and drive coil 122a in focus actuator 122 is driven by drive circuit 123.

When no electric power is supplied to lens barrel 120, two MOSFETs 136 in optical MOSFET 133 are turned ON. Therefore, optical MOSFET 133 connects to drive coil 122a in focus actuator 122. Consequently, optical MOSFET 133 connected to drive coil 122a short-circuits both ends of drive coil 122a in focus actuator 122.

More specifically, when the electric power is supplied to lens barrel 120, optical MOSFET 133 is disconnected from focus actuator 122 so that no current flows through optical MOSFET 133. When no electric power is supplied, to lens barrel 120, optical MOSFET 133 connects to focus actuator 122, thereby short-circuiting both ends of drive coil 122a. In this way, optical MOSFET 133 configures a relay construction having a normally closed contact.

[1-2. Operation]

A description will be given below of an operation of digital camera 100 configured above, which serves as an imaging device.

In digital camera 100, focus lens L3 within lens barrel 120, which serves as a movable lens, moves to perform focusing, and then a focused subject image captured by imaging element 111 is stored.

In a state where no electric power is supplied to lens barrel 120, there is a risk that focus lens L3 may freely move along guide shaft 127a and collide with mechanical end 130, other parts of lens frame 131, and such other components.

A detailed description will be given of an operation of digital camera 100 in an OFF state where no electric power is supplied to lens barrel 120.

Specifically, a description will be given of an operation of optical MOSFET 133, which exemplifies switching circuit 125, when no electric power is supplied to lens barrel 120, with reference to FIG. 4 and FIG. 5.

Figure 5:
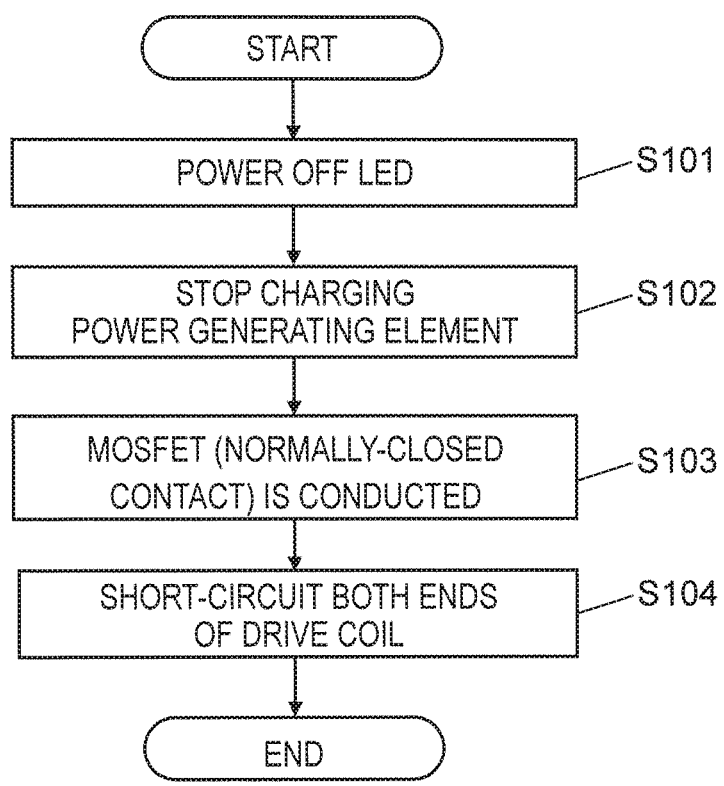
FIG. 5 is a flowchart of an operation of the switching circuit in the first exemplary embodiment.

FIG. 5 is a flowchart of an operation of optical MOSFET 133, which exemplifies switching circuit 125 in the first exemplary embodiment, when the electric power supply is in an OFF state.

Herein, the expression "the electric power supply is in an OFF state" means that the electric power supply is in a state where the electric power supply to drive circuit 123 and other components is turned OFF, when, for example, lens barrel 120 is detached from camera main body 110.

In the above case, as illustrated in FIG. 5, the electric power supply to LEI) 134 is interrupted, and LED 134 stops emitting light (Step S101). In response to this, charging of power generating element 135 including a photodiode, for example, is stopped (Step S102).

A voltage between gate G and source S of each of two MOSFETs 136 drops, and drain D and source S become electrically continuous to each other (Step S103). Optical MOSFET 133 thereby connects to both ends of drive coil 122a in focus actuator 122 and short-circuits both ends of drive coil 122a (Step S104). In this state, if focus lens L3 starts to move along guide shaft 127a of guide member 127 due to the weight of focus lens L3 when lens barrel 120 has a certain attitude, for example, a voltage generates across drive coil 122a in focus actuator 122 (i.e., a counter electromotive force acts on drive coil 122a). This counter electromotive force acts on drive coil 122a so as to suppress movement of drive coil 122a. Consequently, focus lens L3 is prevented from moving.

[1-3. Function and Effect]

As described above, in digital camera 100 in the first exemplary embodiment, when electric power supply to drive circuit 123 is interrupted, optical MOSFET 133 becomes electrically continuous, thereby short-circuiting both ends of drive coil 122a in focus actuator 122. This prevents movement of focus lens L3 even when lens barrel 120 is shaken or inclined. Therefore, it is possible to prevent focus lens L3 from colliding with mechanical end 130, other parts of lens frame 131, and such other components and thus to prevent a collision sound from being made. Consequently, it is possible to reduce the risk that a collision sound makes a user feel something strange.

In the configuration of the first exemplary embodiment, drive coil 122a is used for focus actuator 122 that drives focus lens L3. It is possible for digital camera 100 to have such configuration only by additionally having optical MOSFET 133 as switching circuit 125. Therefore, it is not necessary to provide any additional mechanisms, including an elastic member used to attenuate a collision sound and a component used to restrict movement of lens frame 121a. Consequently, it is possible for lens barrel 120 to keep a reduced size.

Second Exemplary Embodiment

A second exemplary embodiment will be described below with reference to FIG. 6 and FIG. 7. Hereinafter, digital camera 100 equipped with an interchangeable lens will be described as an exemplary imaging device, similar to the foregoing first exemplary embodiment.

[2-1. Configuration]

Figure 6:
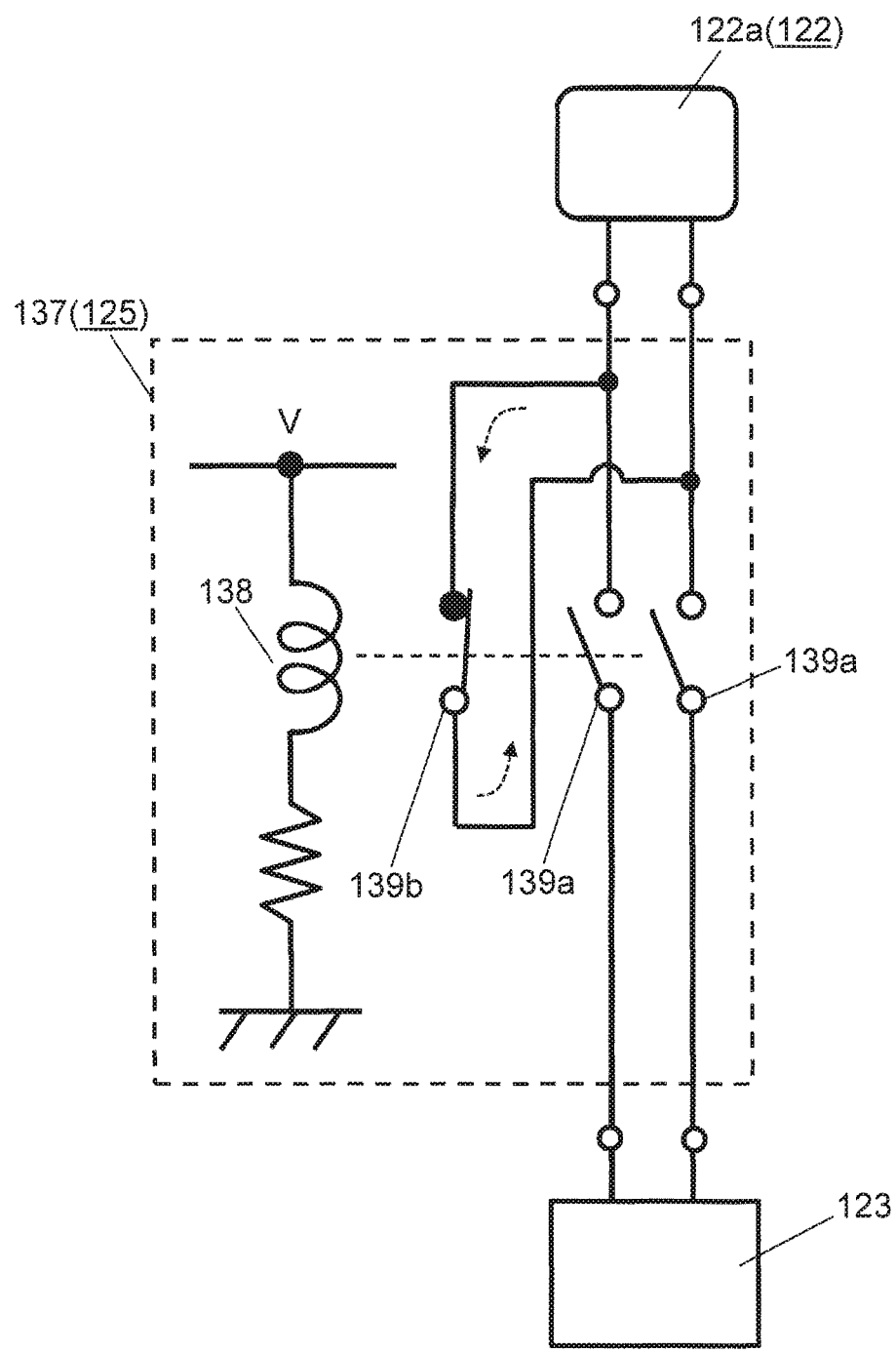
FIG. 6 is a schematic diagram of a switching circuit in a second exemplary embodiment.

Digital camera 100 in the second exemplary embodiment differs from digital camera 100 in the first exemplary embodiment in that relay circuit 137 illustrated in FIG. 6 is used as switching circuit 125. An overall configuration of digital camera 100 other than the above difference is substantially the same as the configuration of the first exemplary embodiment, and will not be described in detail accordingly.

FIG. 6 illustrates a configuration of relay circuit 137, which exemplifies switching circuit 125, in a state in which no electric power is supplied to relay circuit 137.

As illustrated in FIG. 6, relay circuit 137 in the second exemplary embodiment includes relay coil 138, which has an iron-core (not illustrated), and a pair of relay switches 139a and relay switch 139b, which have a spring. When no electric power is supplied to relay circuit 137, the pair of relay switches 139a is maintained in an opened state and relay switch 139b is maintained in a closed, state, due to the effect of their springs.

When being supplied with the electric power from camera main body 110, drive circuit 123 supplies the electric power to drive coil 122a in focus actuator 122, which serves as a driver, and controls drive coil 122a. In this state, drive circuit 123 and drive coil 122a in focus actuator 122 are connected in series to relay switches 139a. In addition, drive coil 122a is connected in parallel to relay switch 139b in an opened state.

When electric power is supplied to lens barrel 120, camera main body 110 applies a voltage across relay coil 138. The iron-core disposed inside relay coil 138 is magnetized to function as a so-called electromagnet. Because of a magnetic force generated by the magnetized iron-core, relay switches 139a constituting a normally open contact are closed against elastic forces of their springs, whereas relay switch 139b constituting a normally closed contact is opened against an elastic force of its spring. Both ends of drive coil 122a in focus actuator 122 thereby connect to drive circuit 123. Consequently, no current flows through relay switch 139b in relay circuit 137.

[2-2. Operation]

A description will be given of an operation of relay circuit 137 configured above in second exemplary embodiment when the electric power supply to drive circuit 123 is in an OFF state, with reference to FIG. 6 and FIG. 7.

Figure 7:
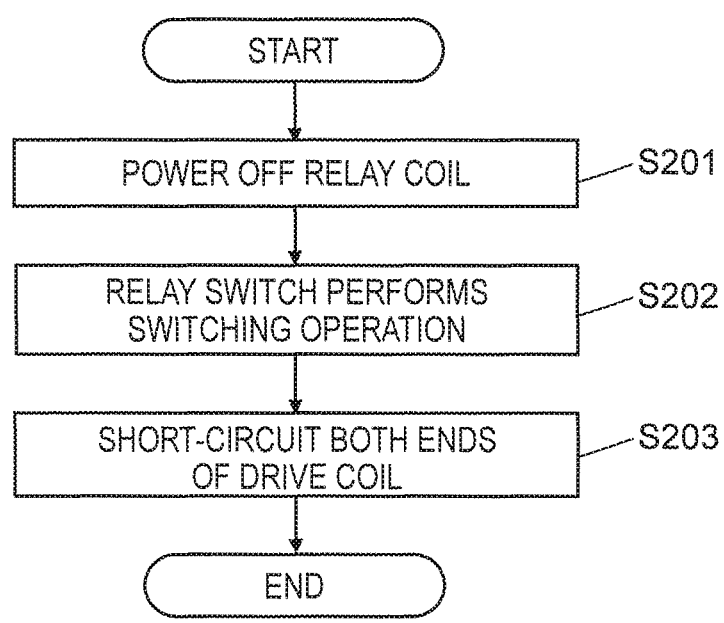
FIG. 7 is a flowchart of an operation of the switching circuit in the second exemplary embodiment.

FIG. 7 is a flowchart of an operation of relay circuit 137 when electric power supply to lens barrel 120 is interrupted.

Herein, similar to first exemplary embodiment, the expression "the electric power supply is in an OFF state" means that the electric power supply is in a state where the electric power supply to lens barrel 120 is interrupted, for example, when power source 113 in camera main body 110 is turned off or when lens barrel 120 is detached from camera main body 110.

As illustrated in FIG. 7, the voltage applied across relay coil 138 is turned off, and then current stops flowing through relay coil 138 (Step S201). In response to this, the electromagnet of relay coil 138 stops generating the magnetic force. As a result, as illustrated in FIG. 6, the relay switches 139a are opened due to the elastic forces of their springs, whereas relay switch 139b is closed due to the elastic force of its spring (Step S202). In short, each of the relay switches 139a and 139b performs a switching operation. More specifically, drive coil 122a disconnects from relay switches 139a and then connects to relay switch 139b.

Relay switch 139b short-circuits both ends of drive coil 122a in focus actuator 122 (Step S203). In this case, if focus lens L3 starts to move along guide shaft 127a of guide member 127 due to the weight of focus lens L3 when lens barrel 120 has a certain attitude, for example, a voltage generates across drive coil 122a in focus actuator 122 (i.e., a counter electromotive force acts on drive coil 122a). This counter electromotive force acts on drive coil 122a so as to suppress movement of drive coil 122a. Consequently, focus lens L3 is prevented from moving.

[2-3. Function and Effect]

As described above, in the second exemplary embodiment, when electric power supply to drive circuit 123 is interrupted, relay switch 139b in relay circuit 137, which serves as switching circuit 125, is closed. Relay switch 139b thereby short-circuits both ends of drive coil 122a in focus actuator 122. In this state, when lens barrel 120 is shaken or inclined and drive coil 122a thereby starts to move, relay coil 138 generates a counter electromotive force, which suppress focus lens L3 from moving. Therefore, it is possible to prevent focus lens L3 from colliding with mechanical end 130 of guide member 127, other parts of lens frame 131, or such other components and thus to prevent a collision sound from being made. Consequently, it is possible to reduce the risk that a collision sound makes a user feel something strange.

Third Exemplary Embodiment

A third exemplary embodiment will be described below with reference to FIG. 8 and FIG. 9. Herein, digital camera 100 equipped with an interchangeable lens will be described as an exemplary imaging device, similar to the foregoing first and second exemplary embodiments.

[3-1. Configuration]

Digital camera 100 in the third exemplary embodiment differs from digital cameras 100 in the first and second exemplary embodiments in a configuration of switching circuit 125 for short-circuiting both ends of drive coil 122a in focus actuator 122. Although specific configurations of drive circuits have been omitted in the foregoing first and second exemplary embodiments, drive circuit 123 may be implemented using an H bridge circuit, for example, as in the third exemplary embodiment. An overall configuration of digital camera 100 other than the above difference is substantially the same as the configurations of the foregoing first and second exemplary embodiments, and will not be described in detail accordingly.

Figure 8:
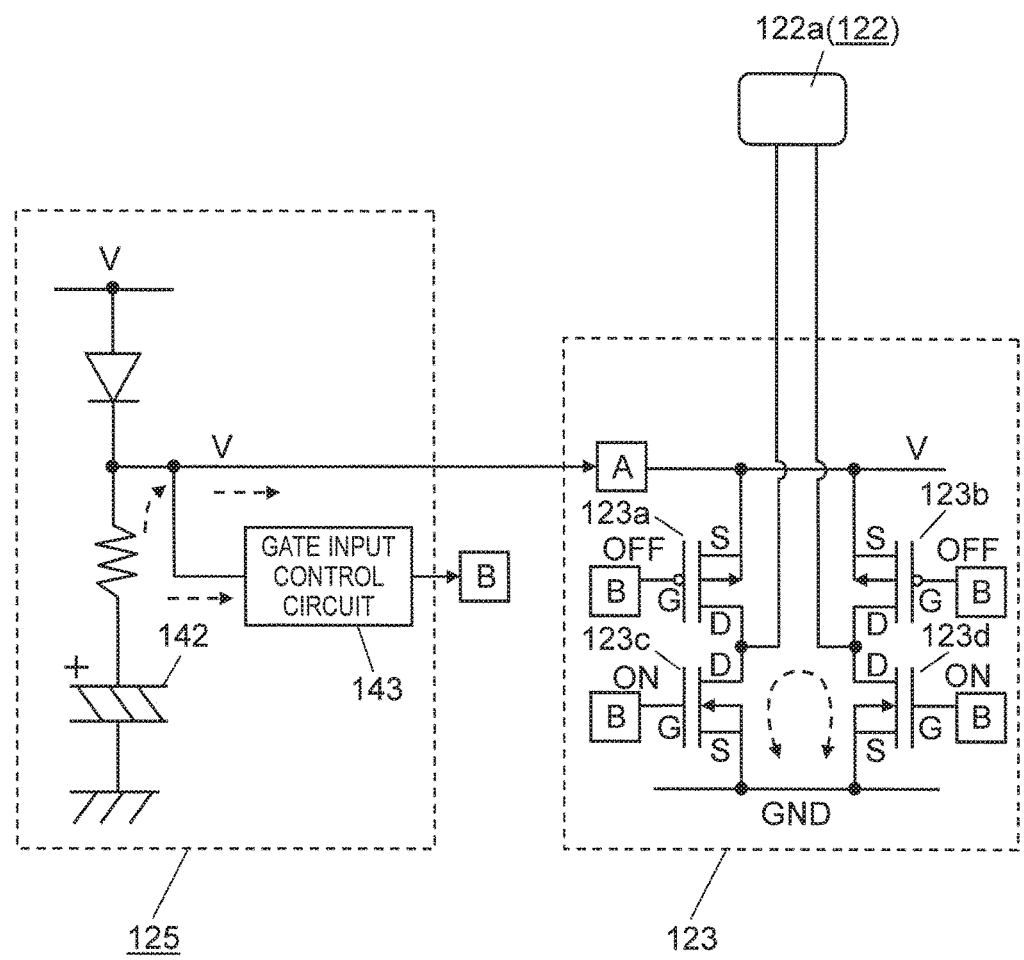
FIG. 8 is a schematic diagram of a switching circuit in a third exemplary embodiment.

FIG. 8 schematically illustrates a configuration of switching circuit 125 in the third exemplary embodiment.

As illustrated in FIG. 8, switching circuit 125 in the third exemplary embodiment includes capacitor 142, which serves as an electric storage device, and gate input control circuit 143.

Capacitor 142 is charged while camera main body 110 is supplying electric power to lens barrel 120. Gate input control circuit 143 controls inputs to gates G of MOSFET 123a to MOSFET 123d, each of which serves as a switching element in the H bridge circuit configuring drive circuit 123, when no electric power is supplied to drive circuit 123.

When being supplied with electric power, drive circuit 123 controls drive coil 122a in focus actuator 122, which serves as a driver, in the following manner.

The H bridge circuit, which configures drive circuit 123, includes P-type MOSFET 123a, N-type MOSFET 123c, P-type MOSFET 123b, and N-type MOSFET 123d, P-type MOSFET 123a being connected in series to N-type MOSFET 123c, P-type MOSFET 123b being connected in series to N-type MOSFET 123d, both P-type MOSFET 123a and N-type MOSFET 123c being connected in parallel to both P-type MOSFET 123b and N-type MOSFET 123d.

When lens barrel 120 is supplied with the electric power from power source 113 in camera main body 110 and drive coil 122a in focus actuator 122 is under the control of lens controller 124, drive circuit 123 operates in the following manner.

When gate input control circuit 143 in switching circuit 125 applies a low-level voltage to gate G of P-type MOSFET 123a and applies a high-level voltage to gate G of N-type MOSFET 123d in the H bridge circuit, a resistance between drain D and source S of each of P-type MOSFET 123a and N-type MOSFET 123d decreases. A current from power source 113 thereby flows through P-type MOSFET 123a, drive coil 122a in focus actuator 122, and N-type MOSFET 123d in a first direction. In this way, lens controller 124 controls drive coil 122a in focus actuator 122 so that focus lens L3 moves, for example, in a predetermined direction.

When gate input control circuit 143 applies a low-level voltage to gate G of P-type MOSFET 123b and applies a high-level voltage to gate G of N-type MOSFET 123c, a resistance between drain D and source S of each of P-type MOSFET 123b and N-type MOSFET 123c decreases. A current from power source 113 thereby flows through P-type MOSFET 123b, drive coil 122a in focus actuator 122, and N-type MOSFET 123c in a second direction that is opposite to the above first direction. In this way, lens controller 124 controls drive coil 122a in focus actuator 122 so that focus lens L3 moves, for example, in the direction opposite to the above predetermined direction.

[3-2. Operation]

A description will be given of an operation of switching circuit 125 configured above in third exemplary embodiment when no electric power is supplied to drive circuit 123, with reference to FIG. 8 and FIG. 9.

Figure 9:
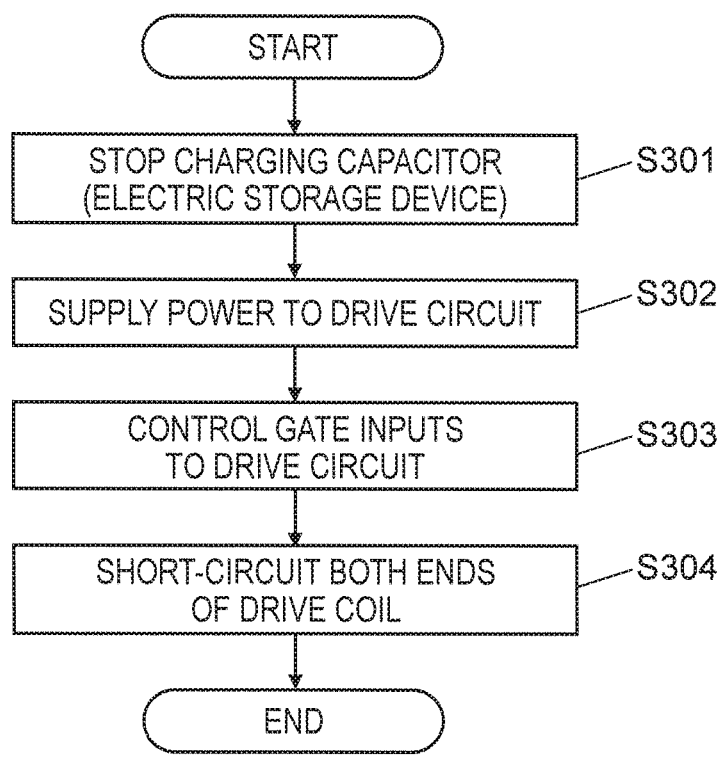
FIG. 9 is a flowchart of operation of the switching circuit in the third exemplary embodiment.

FIG. 9 is a flowchart of an operation of switching circuit 125 when electric power supply to drive circuit 123 is interrupted.

Herein, similar to the first exemplary embodiment, the expression "the electric power supply is in an OFF state" means that the electric power supply is in a state where the electric power supply to lens barrel 120 is interrupted, for example, when power source 113 in camera main body 110 is turned off or when lens barrel 120 is detached from camera main body 110.

As illustrated in FIG. 9, when the electric power supply to lens barrel 120 is interrupted, the charging of capacitor 142 is interrupted (Step S301). As a result, electric power stored in capacitor 142 is supplied to drive circuit 123 (Step S302).

Gate input control circuit 143 in switching circuit 125 detects, for example, a drop of a voltage that power source 113 applies to switching circuit 125 and then switches an operation of controlling drive circuit 123. In this case, switching circuit 125 may be provided with another circuit, such as a power-off switching circuit, in addition to gate input control circuit 143. If this power-off switching circuit detects an interruption of electric power supply to lens barrel 120, the power-off switching circuit may switch from an operation of supplying electric power from power source 113 to an operation of supplying electric power stored in capacitor 142. Then, the power-off switching circuit may supply the electric power to drive circuit 123.

Then, gate input control circuit 143 applies a high-level voltage to gates G of P-type MOSFET 123a and P-type MOSFET 123*b* in drive circuit 123, unlike the case where switching circuit 125 is connected to power source 113. Simultaneously, gate input control circuit 143 applies a high-level voltage to gates G of N-type MOSFET 123*c* and N-type MOSFET 123*d*. In short, gate input control circuit 143 controls inputs to gates G of P-type MOSFET 123*a*, P-type MOSFET 123*b*, N-type MOSFET 123*c*, and N-type MOSFET 123*d* in drive circuit 123 so that P-type MOSFET 123*a* and P-type MOSFET 123*b* are turned OFF and N-type MOSFET 123*c* and N-type MOSFET 123*d* are turned ON (Step S303). Consequently, both ends of drive coil 122*a* in focus actuator 122 are short-circuited, as indicated by a dotted arrow in FIG. 8 (Step S304).

In the above way, both ends of drive coil 122*a* in focus actuator 122 are short-circuited. In this case, if focus lens L3 starts to move along guide shaft 127*a* of guide member 127 due to the weight of focus lens L3 when lens barrel 120 has a certain attitude, for example, a voltage generates across drive coil 122*a* in focus actuator 122 (i.e., a counter electromotive force acts on drive coil 122*a*). This counter electromotive force acts on drive coil 122*a* so as to suppress movement of drive coil 122*a*. Consequently, focus lens L3 is prevented from moving.

[3-3. Function and Effect]

As described above, in the third exemplary embodiment, when electric power supply to drive circuit 123 is interrupted, capacitor 142 that has been charged supplies electric power to drive circuit 123. Then, gate input control circuit 143 in switching circuit 125 controls drive circuit 123 to short-circuit both ends of drive coil 122*a* in focus actuator 122. In this state, when lens barrel 120 is shaken or inclined and drive coil 122*a* thereby starts to move, a counter electromotive force is generated. This prevents focus lens L3 from colliding with mechanical end 130 of guide member 127, other part of lens frame 131, and such other components and thus prevents a collision sound from being made. Consequently, it is possible to reduce the risk that a collision sound makes a user feel something strange.

Other Exemplary Embodiments

The first to third exemplary embodiments, which exemplify techniques disclosed in the present application, have been described. However, the techniques in the present disclosure are not limited to the first to third exemplary embodiments and these exemplary embodiments may undergo modifications, substitutions, additions, omissions, and the like. In addition, the techniques in the present disclosure may employ new exemplary embodiments that include a combination of constitute elements in the first to third exemplary embodiments.

Exemplary embodiments as described above are exemplary techniques in the present disclosure and thus can undergo various modifications, substitutions, additions, omissions, and the like within the scopes of the claims and their equivalents.

What is claimed is:

1. A lens barrel comprising:
a lens frame;
a movable lens held in the lens frame;
a guide member that moves the lens frame in a first direction;
a driver including a drive coil and a magnet that move the lens frame with electric power being supplied to the driver;
a drive circuit that drives the driver; and
a switching circuit that short-circuits ends of the drive coil when the drive circuit is in a non-energized state,
wherein the switching circuit is separate from the drive circuit and is connected between the driver and the drive circuit.

2. The lens barrel according to claim 1, wherein
the switching circuit includes a light emitting diode, a power generating element that generates electric power by receiving light from the light emitting diode, and a switching element connected to the drive coil.

3. The lens barrel according to claim 2, wherein
the switching element includes a MOSFET.

4. The lens barrel according to claim 1, wherein
the switching circuit includes a relay coil and a relay switch connected to the drive coil.

5. The lens barrel according to claim 4, wherein
the relay coil is configured to be an electromagnet.

6. The lens barrel according to claim 1, wherein
the switching circuit includes an electric storage device and a gate input control circuit, and
when the drive circuit is separated from an external power source and is in the non-energized state, the gate input control circuit causes the drive circuit to short-circuit the ends of the drive coil using electric power stored in the electric storage device.

7. The lens barrel according to claim 6, wherein
the electric storage device includes a capacitor.

8. The lens barrel according to claim 1, wherein
the guide member has a guide shaft, and
the lens frame is configured to move along the guide shaft.

9. The lens barrel according to claim 1, wherein
when the drive circuit is in the non-energized state and the lens frame starts to move, the drive coil of the driver generates a counter electromotive force that prevents the lens frame from moving.

10. An imaging device comprising:
the lens barrel according to claim 1; and
an imaging main body equipped with the lens barrel.

* * * * *